(No Model.)
W. C. WATSON.
CAR COUPLING.
No. 576,387. Patented Feb. 2, 1897.
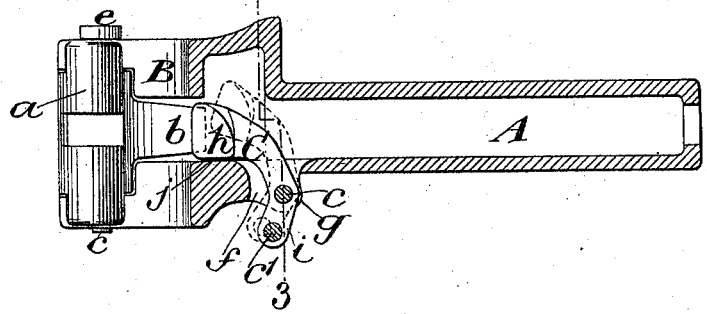
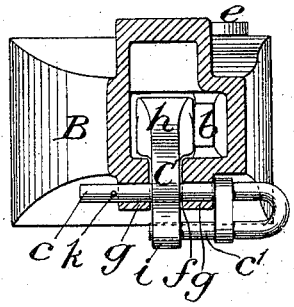
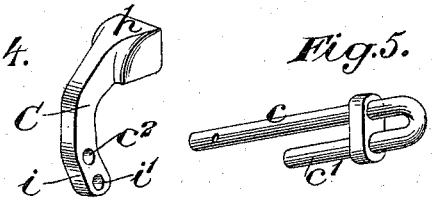
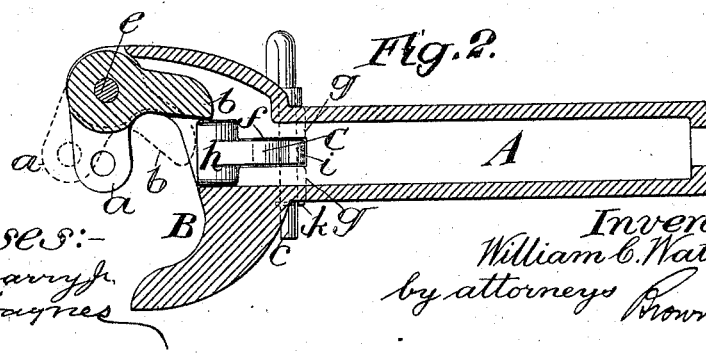
Witnesses:—
George Barry Jr.
Fred'k Haynes
Inventor:—
William C. Watson
by attorneys
Brown & Seward

UNITED STATES PATENT OFFICE.

WILLIAM C. WATSON, OF PATERSON, NEW JERSEY.

CAR-COUPLING.

SPECIFICATION forming part of Letters Patent No. 576,387, dated February 2, 1897.

Application filed May 29, 1896. Serial No. 593,534. (No model.)

*To all whom it may concern:*

Be it known that I, WILLIAM C. WATSON, of Paterson, in the county of Passaic and State of New Jersey, have invented a new and useful Improvement in Car-Couplings, of which the following is a specification.

This invention relates to what are known as "rotary" or "knuckle" couplings. Its object is to provide a very simple means for locking such a coupling in its coupled condition and for unlocking it when it is required to uncouple.

I will first describe the improvement in detail with reference to the accompanying drawings and then point out its novelty in a claim.

Figure 1 represents a longitudinal vertical section of one member of a coupling embodying my invention; Fig. 2, a horizontal section of the same; Fig. 3, a transverse vertical section taken approximately in the line 3 3 of Fig. 1. Figs. 4 and 5 are perspective views of some of the details of the coupling member.

Similar letters of reference designate corresponding parts in all the figures.

A B designate the draw-head, represented as one casting, consisting of a draw-bar A and a hollow forked buffer-head B. To one side of this head the rotary or knuckle coupling-piece $a\ b$ is pivoted by a pin $e$. The said coupling-piece is of the elbow form common to couplings of this class, consisting of a hooked portion $a$, which projects within the fork of the head to engage with the corresponding portion of a coupling member on another car, and an angularly-extending tongue $b$, which is acted upon to throw the coupling into engagement and to lock it when engaged or coupled. The draw-head A B with the knuckle coupling-piece attached may be adapted to a railway-car in any known or suitable manner.

C is a locking-dog which constitutes an essential feature of my invention and which by means of its own weight is made to engage with the tongue $b$ of the coupling-piece to lock the latter in the position for coupling. The said dog works on a horizontal pivot $c$, which is arranged in the bottom of the draw-head some distance in rear of the coupling-piece, the said dog working through a slot $f$ in the bottom of the draw-head and the said pivot turning freely in two lugs $g\ g$, provided on the draw-head on opposite sides of said slot. The head $h$ of the said dog projects forward from the pivot and is made of such weight that when not otherwise controlled or manipulated it will drop by gravity to a position in which it will rest, as shown in Fig. 1, on a bearing $j$ within the hollow buffer-head. When in this position, while the coupling-piece $a\ b$ is in the coupling position (shown in Figs. 1, 2, and 3) the head of the dog will interpose itself, as shown in Fig. 2, between the tongue $b$ of the coupling-piece and the opposite side of the interior of the buffer-head and so lock the said coupling-piece.

The locking-dog C has a tail piece $i$, which projects downward below the pivot $c$ and through the slot $f$ in the draw-head, and in this tailpiece there is a hole $i'$ below the pivot-hole $c^2$ for the reception of the lower prong $c'$ of the two-pronged bolt, the upper prong $c$ of which constitutes the pivot of the locking-dog, the said prong $c'$ passing under the draw-head and into the hole $i'$ when the pivot is inserted through the lugs $g$ and the dog. The bolt $c\ c'$ is secured in place endwise by any suitable means, as, for instance, by a pin $k$, inserted through the pivot-prong $c$. The prong $c'$, while it leaves the pivot $c$ free to turn for the action of the locking-dog, provides for the operation of the dog to liberate the coupling by any suitable means operated from the platform or other part of the car and connected with the head of the bolt. This head may be of any suitable form, according to the means to be applied to it for uncoupling. It is represented as consisting of a loop with a collar.

The dog C not only makes the coupling self-locking, but it permits the self-coupling of the cars, for although it drops naturally to the locking position it will be moved back by the tongue $b$ of the coupling-piece as the cars come together until the coupling-piece arrives in the coupling position, when the said tongue passes by the dog and lets the latter drop down beside it.

What I claim as my invention is—

The combination with the draw-head and a coupling-piece of elbow or knuckle form pivoted thereto, of a locking-dog pivoted to the said head and having a tailpiece projecting downward through and below said head, and a two-pronged bolt of which one prong forms the pivot between the coupling-piece and the head and the other prong engages with said tailpiece for operating the said dog to disengage the coupling-piece, substantially as herein described.

WILLIAM C. WATSON.

Witnesses:
 FREDK. HAYNES,
 GEORGE BARRY, Jr.